(12) United States Patent
Witte-Merl

(10) Patent No.: US 7,849,676 B2
(45) Date of Patent: Dec. 14, 2010

(54) METHOD FOR ADDING AT LEAST ONE REACTANT TO AN EXHAUST GAS STREAM AND DEVICE FOR TREATING AN EXHAUST GAS STREAM OF AN INTERNAL COMBUSTION ENGINE

(75) Inventor: Olaf Witte-Merl, Weilerswist (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 685 days.

(21) Appl. No.: 11/841,282

(22) Filed: Aug. 20, 2007

(65) Prior Publication Data

US 2008/0041036 A1 Feb. 21, 2008

(30) Foreign Application Priority Data

Aug. 18, 2006 (DE) .................. 10 2006 038 904

(51) Int. Cl.
*F01N 3/00* (2006.01)
(52) U.S. Cl. .............................. 60/286; 60/274; 60/295; 60/301; 60/303
(58) Field of Classification Search .................. 60/274, 60/286, 295, 296, 297, 301, 303
See application file for complete search history.

(56) References Cited

U.S. PATENT DOCUMENTS

| | | | |
|---|---|---|---|
| 4,854,123 A * | 8/1989 | Kobayashi et al. | 60/274 |
| 5,406,790 A * | 4/1995 | Hirota et al. | 60/276 |
| 6,409,973 B1 * | 6/2002 | Kinugasa et al. | 422/171 |
| 6,601,385 B2 * | 8/2003 | Verdegan et al. | 60/286 |
| 7,210,288 B2 * | 5/2007 | Bandl-Konrad et al. | 60/297 |
| 7,264,785 B2 * | 9/2007 | Blakeman et al. | 423/213.2 |
| 7,448,206 B2 * | 11/2008 | Meingast et al. | 60/286 |
| 2003/0108457 A1 | 6/2003 | Gault et al. | |

(Continued)

FOREIGN PATENT DOCUMENTS

DE  10242412 A1  3/2004

(Continued)

OTHER PUBLICATIONS

European Search Report dated Apr. 3, 2009.

*Primary Examiner*—Binh Q. Tran
(74) *Attorney, Agent, or Firm*—Laurence A. Greenberg; Werner H. Stemer; Ralph E. Locher

(57) ABSTRACT

A method for adding at least one, in particular liquid, reactant, to an exhaust gas stream of an internal combustion engine includes adding a reactant flow to the stream downstream of an element provided for an at least partial conversion and/or at least partial elimination of at least one component of the stream, so that at least part of the reactant flow impinges on the element. This achieves rapid evaporation of the reactant flow. Impinging on the element, which is hot during operation, i.e. at temperatures of 400° C. and more, causes rapid evaporation and, because of a preferably porous coating of the element, take-up of the reactant solution into the element with successive evaporation. Urea, in particular, can be evaporated quickly, effectively and virtually completely upon introduction into an exhaust system as a reducing agent for selective catalytic reduction of nitrogen oxides, in particular in a downstream SCR catalytic converter.

13 Claims, 2 Drawing Sheets

U.S. PATENT DOCUMENTS

| | | |
|---|---|---|
| 2006/0008397 A1 | 1/2006 | Brück |
| 2007/0035832 A1 | 2/2007 | Hirata et al. |
| 2007/0036694 A1* | 2/2007 | Nishioka et al. ............ 422/168 |
| 2008/0264048 A1 | 10/2008 | Nishiyama et al. |

FOREIGN PATENT DOCUMENTS

| | | |
|---|---|---|
| JP | 2002221024 A | 8/2002 |
| JP | 2005214172 A | 8/2005 |
| WO | 2004063540 A1 | 7/2004 |
| WO | 2006057305 A1 | 6/2006 |

* cited by examiner

METHOD FOR ADDING AT LEAST ONE REACTANT TO AN EXHAUST GAS STREAM AND DEVICE FOR TREATING AN EXHAUST GAS STREAM OF AN INTERNAL COMBUSTION ENGINE

CROSS-REFERENCE TO RELATED APPLICATION

This application claims the priority, under 35 U.S.C. §119, of German Patent Application DE 10 2006 038 904.2, filed Aug. 18, 2006; the prior application is herewith incorporated by reference in its entirety.

BACKGROUND OF THE INVENTION

Field of the Invention

The subject matter of the present invention is a method for adding a reactant to an exhaust gas stream of an internal combustion engine, and a device for treating an exhaust gas stream of an internal combustion engine. In particular, the method according to the invention and the device according to the invention can be used for the selective catalytic reduction of nitrogen oxides in the exhaust gas of internal combustion engines.

The exhaust gas from internal combustion engines contains substances that are undesirable as atmospheric emissions. In many countries, mandatory limit values are prescribed for the emission of such substances, for example in the exhaust gas of automobiles, and in fact any internal combustion engines. Those substances include nitrogen oxides ($NO_x$). On one hand, the emission of nitrogen oxides is lowered by measures provided internally in the engine, on the other hand additional exhaust treatment measures are increasingly being used. Those exhaust treatment measures include selective catalytic reduction, in which a reducing agent acting selectively on the nitrogen oxides is added to the exhaust gas, which in the presence of a corresponding catalyst causes the conversion of the nitrogen oxides. The most commonly used reducing agent for nitrogen oxides is urea, which is often added to the exhaust gas in the form of a urea-water solution, possibly with further substances. Urea can break down into ammonia, for example by hydrolysis under reaction with water and/or by thermolysis.

In principle, it is advantageous to achieve the most complete possible evaporation of the urea-water solution when it is introduced into the exhaust system, since incomplete evaporation has the resultant effect that droplets of the urea-water solution flying through the exhaust system cause a cooling of elements that are provided in the exhaust system, such as for example catalyst carrier bodies and/or particle filters, which may in the long term lead to those elements being damaged. Furthermore, undesired reactions or deposits may occur in the exhaust system.

It is known from International Publication No. WO 2004/063540 A1, corresponding to U.S. patent application Ser. No. 11/181,420 and U.S. Patent Application Publication No. US 2006/0008397 A1, to introduce urea in a deflecting region of an exhaust treatment unit. However, that adding method is also disadvantageous, since inadequate evaporation of the urea or the urea-water solution is achieved.

SUMMARY OF THE INVENTION

It is accordingly an object of the invention to provide a method for adding at least one reactant to an exhaust gas stream and a device for treating an exhaust gas stream of an internal combustion engine, which overcome the hereinafore-mentioned disadvantages of the heretofore-known methods and devices of this general type and with which an improved evaporation rate of a urea-water solution can be achieved when it is added to the exhaust gas stream.

With the foregoing and other objects in view there is provided, in accordance with the invention, a method for adding at least one reactant to an exhaust gas stream of an internal combustion engine. The method comprises providing an element for carrying out at least one of the following operations: a) an at least partial conversion, and b) an at least partial elimination, of at least one component of the exhaust gas stream. A reactant flow is added to the exhaust gas stream downstream of the element to cause at least part of the reactant flow to impinge on the element.

An element for carrying out at least one of the following operations: a) an at least partial conversion and b) an at least partial elimination, of at least one component of the exhaust gas stream, is understood in particular as meaning a catalyst carrier body, which includes a catalytically active coating, in particular in a washcoat, that acts as a catalyst for a conversion of at least one component of the exhaust gas. Alternatively or in addition, the element may also have the function of a particle filter or a particle trap, in order to reduce the concentration of particles in the exhaust gas, in particular of particulates. This may be either a closed particle filter, which includes a multiplicity of channels or passages that are alternately closed, or what is known as a partial flow filter, in the case of which part of the exhaust gas is conducted into a porous medium through the use of corresponding internal elements. Both the catalyst carrier body and the particle filter may, in particular, be advantageously constructed as a honeycomb body, in the case of which a ceramic and/or metallic body is formed with a multiplicity of cavities through which a flow can pass. In particular, the honeycomb body may be wound into a body from at least one at least partially structured metallic layer and possibly at least one substantially smooth layer or one or more stacks of such layers of sheet metal twisted in the same or opposite directions. Catalyst carrier bodies and particle filters of ceramic or metallic foam, of wire mesh or the like are also advantageously possible and within the scope of the invention. Alternatively or in addition, the elements may also merely be formed of a coating on a surface or include such a coating, for example on an inner wall of a tube, for example a casing tube or the exhaust pipe. Elimination is understood herein as meaning not only a reduction of the particle concentration but also an elimination of liquids, such as in particular water, on and/or in the element which, for this purpose, has in particular, an at least partially porous form.

With particular preference, the reactant flow represents a stream of drops of a reactant solution which is introduced into the exhaust system. The adding of the reactant flow in countercurrent, which takes place downstream of the element, leads to an immediate vortexing of the reactant flow and consequently to a uniform distribution of the reactant in the exhaust gas, and possibly already to a partial evaporation of the reactant flow as a result of the heat of the exhaust gas. Due to the usual exothermal reactions that take place at the element, and in principle also as a result of the heating up by the hot exhaust gas, the fact that the reactant flow is added in such a way that at least part of the reactant flow impinges on the element, has the effect during operation of evaporating the reactant flow on the element. In addition, the element often has a catalytically reactive coating, which is usually porous. Consequently, a part of the reactant flow that has not immediately evaporated can be taken up by the coating of the element and temporarily stored. Due to the temperature of the element, evaporation and release of the incorporated reactant solution occurs in this case in a short time.

In accordance with another mode of the invention, at least 80 wt.–% of the reactant flow impinges on the element.

In a preferred embodiment even at least 85 wt.–% (weight–%) of the reactant flow impinges on the element. This is, in particular, advantageous if the element is porous or has a porous coating at least in the region on which the reactant flow impinges.

In accordance with a further mode of the invention, the reactant flow includes droplets having a mean diameter of at least 30 micrometers.

In a preferred version of the method, the mean diameter of the droplets is at least 40 micrometers or even at least 50 micrometers. This distribution of droplet sizes results in a large contingent of the droplets impinging on the element without the necessity of high flow velocities of the reactant flow.

In accordance with an added mode of the invention, a decomposition reaction of at least one component of the reactant flow occurs at least in a region in which the reactant flow impinges on the element.

The decomposition reaction can, for example, be a hydrolysis and/or thermolysis reaction of a reducing agent precursor such as urea, or an oxidization reaction if the reactant flow includes hydrocarbons. The element includes e.g., at least in this region, a respective catalytically active coating such as e.g. a coating catalyzing a hydrolysis reaction or a coating catalyzing an oxidation reaction.

In accordance with an additional mode of the invention, the reactant flow includes at least one of the following substances:
  a) a reducing agent, and
  b) a reducing agent precursor.

In particular, this is a reducing agent for the selective catalytic reduction of nitrogen oxides. A reducing agent precursor is understood as meaning a substance which can release a reducing agent and/or can react to form a reducing agent.

In accordance with yet another mode of the invention, the reactant flow includes at least one of the following substances or a derivative thereof:
  a) urea (($NH_2$)$_2$CO);
  b) ammonium formiate (HCOONH$_4$);
  c) ammonium carbamate (H$_2$NCOONH$_4$);
  d) ammonium carbonate ((NH$_4$)$_2$CO$_3$);
  e) ammonium bicarbonate (NH$_4$HCO$_3$);
  f) ammonium oxalate ((NH$_4$)$_2$(C$_2$O$_4$));
  g) ammonium hydroxide (NH$_4$OH);
  h) cyanic acid (HOCN);
  i) cyanuric acid (C$_3$H$_3$N$_3$O$_3$);
  j) isocyanic acid (HNCO); and
  k) ammonia (NH$_3$).

At least one of the aforementioned substances can be introduced into the exhaust gas stream in a particularly advantageous way in the form of an aqueous solution as a so-called reactant solution in the form of a stream of small droplets. In particular, the aqueous solution in this case includes both urea and ammonium formiate and possibly further substances. A corresponding solution is sold under the trade name "Denoxium". Furthermore, it may be a urea-water solution sold under the trade name "AdBlue".

In accordance with yet a further mode of the invention, at least one of the following variables:
  a) an average velocity of the reactant flow,
  b) an average mass flow rate of the reactant flow, and
  c) the composition of the reactant flow,
  can be set in dependence on at least one of the following variables:
    A) the composition of the exhaust gas stream,
    B) an average velocity of the exhaust gas stream, and
    C) characteristic operating variables of the internal combustion engine.

The average velocity of the reactant flow is, in particular, a velocity that is averaged spatially over a defined region of the reactant flow. The same applies to the average mass rate of flow of the reactant flow. In particular, the composition of the reactant flow is understood as meaning the concentration of one or more substances, in particular one or more of the aforementioned substances. The composition of the exhaust gas stream is understood in particular as meaning the concentration of one or more substances, such as in particular the nitrogen oxide concentration, or else the concentration of individual nitrogen oxides (NO, NO$_2$). The average velocity of the exhaust gas stream is, in particular, a velocity of the exhaust gas stream averaged spatially over a region of the exhaust gas stream. The characteristic operating variables of the internal combustion engine are understood, in particular, as meaning all the characteristic variables that characterize the operating state of the internal combustion engine, such as rotational speed, load state, etc. Apart from the values for the specified variables at a given time, these may also be forecast values for the variables which can, for example, be predicted for the future on the basis of changes to the characteristic operating variables that have just occurred. The respective variables A, B and C can be measured and/or calculated.

In principle, it is advantageously possible to rely on the fact that the velocities of the exhaust gas stream and of the reactant flow represent vectorial variables. For instance, the vector including the reactant velocity may be decomposed into a component antiparallel to the average velocity of the exhaust gas and a component perpendicular to the average velocity of the exhaust gas. The average velocities are preferably obtained through the use of spatial averaging.

In accordance with yet an added mode of the invention, the adding of the reactant flow may take place in a region of an at least partial change in the direction of the exhaust gas stream.

An at least partial change in direction is understood herein as meaning, for example, a change in direction of the entire exhaust gas stream or else a branch of a partial stream, for example by a correspondingly provided coupling element or valve element. In such regions, and in regions where the exhaust gas as a whole is deflected, turbulences usually form, and these can be advantageously used for mixing the reactant flow with the exhaust gas stream, so that the reactant is mixed with the exhaust gas as well as possible. Furthermore, an at least partial change in direction is also understood as meaning a change in direction of partial streams, such as, for example, as occur when the flow passes through conical components.

The method according to the invention for adding at least one reactant to an exhaust gas stream may be used in a particularly advantageous way in the course of a method for the selective catalytic reduction of nitrogen oxides in the exhaust gas stream of an internal combustion engine. In addition to the method steps specified above that have to be carried out at the least, in this case there follows a method step in which, after adding the reactant flow, that is to say downstream of this adding, a selective catalytic reduction of nitrogen oxides takes place, for example on a correspondingly provided element. In this case, the reactant flow advantageously includes at least one reducing agent and/or at least one reducing agent precursor, preferably at least one urea in aqueous solution.

With the objects of the invention in view, there is also provided a device for treating an exhaust gas stream of an internal combustion engine having a direction of flow. The device comprises at least one element for carrying out at least one of the following operations: a) an at least partial conversion and b) an at least partial elimination, of at least one component of the exhaust gas stream. An adding unit is disposed downstream in the direction of flow, for adding a reactant flow in an adding region. The adding unit is oriented or aligned in such a way that the reactant flow impinges at least partially on the element during operation.

This is achieved, in particular, by the adding unit being oriented or aligned in such a way that the velocity vector of the emerging reactant flow, the direction of which is substantially determined by the alignment or orientation of the adding unit, points toward the element, and in particular an end face of the element. This means that a line leading straight from the adding unit in the direction of the emerging reactant flow, and in particular in a main outlet direction of the adding unit, meets the element. This has the result that a reactant flow is introduced into the exhaust gas stream in countercurrent.

In accordance with yet another feature of the invention, the adding unit is provided in such a way that the element is provided in the direction of the average reactant velocity when it leaves the adding unit.

This is understood as meaning, in particular, that the element is provided in the direction of the flow from the adding unit. This advantageously allows, in a simple way, the provision of a device in which the reactant flow impinges at least partially on the element during operation.

In accordance with yet a further feature of the invention, the element has a porous coating and/or is porous, at least in partial regions.

In particular, this may be a coating in the form of a washcoat, which possibly includes catalytically active centers. In particular, the element has a porous coating in the region in which at least part of the reactant flow impinges on the element during operation.

In accordance with yet an added feature of the invention, the coating, at least in the region in which part of the reactant flow impinges on the element during operation, meets at least one of the following conditions:
  a) the coating is platinum-free;
  b) the coating acts as a catalyst for a hydrolysis of a reducing agent precursor to form a reducing agent;
  c) the coating is resistant to water impact;
  d) the coating can take up a liquid; and
  e) the coating has a porosity of 50% and more.

In particular, the coating is formed in such a way that it acts as a catalyst for a hydrolysis of urea to form ammonia. A platinum-free coating prevents undesired reactions of the reducing agent or the reducing agent precursor that would lead to undesired decomposition of the reducing agent precursor without releasing the reducing agent. Resistance to water impact is understood, in particular, as meaning that a liquid such as water in particular, at a lower temperature than that of the coating, can impinge on the latter during operation without the coating being damaged as a result. In particular, this means that drops of a temperature of from 70 to 90° C. can impinge on the coating at a temperature of from 150 to 400° C. without the coating being damaged, in particular without parts of the coating flaking off. In particular, the coating is suitable for taking up water and/or an aqueous solution, preferably at least urea.

In accordance with yet an additional feature of the invention, a deflecting device is provided, through the use of which an at least partial deflection of the exhaust gas stream can be achieved, at least in the adding region.

In accordance with still another feature of the invention, the adding unit can be connected to a reservoir for a reactant.

This is, in particular, a tank which holds at least one reducing agent precursor and/or a reducing agent for the selective catalytic reduction of nitrogen oxides in the exhaust gas. This is, in particular, a urea-water solution, which may possibly contain further substances, such as for example ammonium formiate. A device for transporting the reactant or for building up pressure in a line may be provided and adapted to allow them to be connected to the reservoir.

In accordance with still a further feature of the invention, the adding unit can be connected to a device for transporting the reactant.

This device for transporting the reactant can take the form, in particular, of a pump, through the use of which transporting a reactant solution to the adding unit is possible, continuously or in a pulsed manner. Alternatively or in addition, the device may have a connection to a transporting medium, for example to compressed air or exhaust gas. If a continuous transporting process is available, a valve through the use of which the amount of reactant flow to be added can be metered, is advantageously provided between the device for transporting and the adding unit.

In accordance with still an added feature of the invention, the adding unit includes a nozzle.

Preferably, this is an atomizer nozzle.

In accordance with still an additional feature of the invention, the adding unit can be connected to an evaporating device for evaporating a liquid reactant solution.

This may, in particular, take the form of an additional heating device which brings about at least partial evaporation of the reactant solution. This allows emergence of the reactant flow, which preferably still also at least partially contains liquid reactant solution, to be brought about by the expansion upon evaporation.

In accordance with a concomitant feature of the invention, it is advantageous that the device for treating an exhaust gas stream includes a further element that is provided downstream of the adding unit and includes a coating to act as a catalyst for the selective catalytic reduction. Such a device may also be referred to as a device for the selective catalytic reduction of nitrogen oxides in the exhaust gas stream of an internal combustion engine.

All of the details and advantages disclosed for the method can be transferred and applied in the same way to the device according to the invention. All of the details and advantages disclosed for the device according to the invention can be transferred and applied to the method according to the invention. The device according to the invention may serve in a preferred way for carrying out the method according to the invention.

Other features which are considered as characteristic for the invention are set forth in the appended claims.

Although the invention is illustrated and described herein as embodied in a method for adding at least one reactant to an exhaust gas stream and a device for treating an exhaust gas stream of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
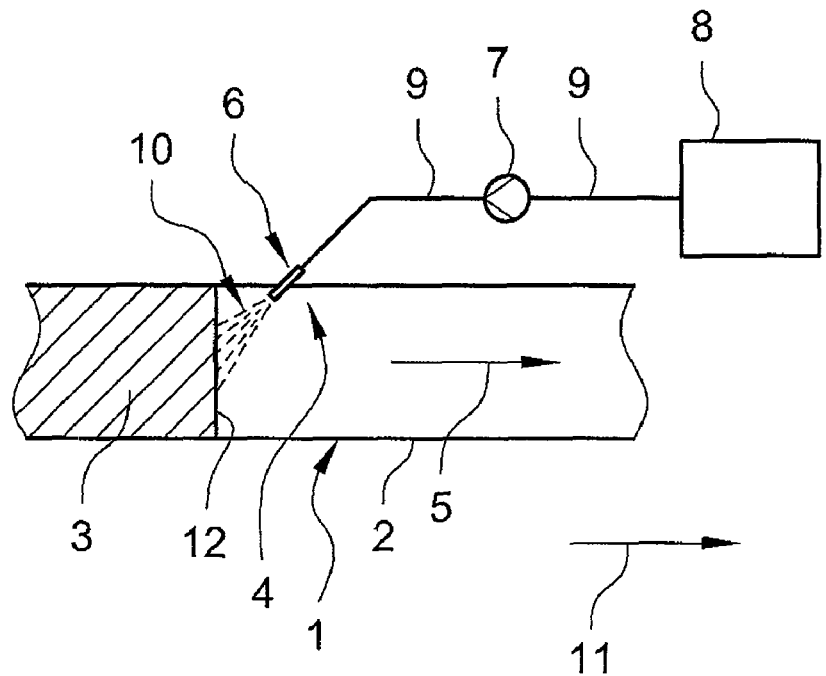
FIG. 1 is a fragmentary, diagrammatic, sectional view of a first exemplary embodiment of a device according to the invention.

Referring now to the figures of the drawings in detail and first, particularly, to FIG. 1 thereof, there is seen a first exemplary embodiment of a device 1 according to the invention for treating an exhaust gas stream 5 of a non-illustrated internal combustion engine. The exhaust gas stream 5 flows through the device 1 during operation in a direction of flow 11. The device 1 is part of an exhaust pipe 2, may be connected to an exhaust pipe 2 or may be formed in such an exhaust pipe 2. The device 1 includes an element 3 for carrying out at least one of the following operations: a) an at least partial conversion, and b) an at least partial elimination of at least one component of the exhaust gas stream 5. The element 3 is, in particular, a particle filter and/or catalyst carrier body, for example, in each case in the form of a honeycomb body. Downstream of the element 3 in the direction of flow 11, an adding unit 4 is provided to add a reactant flow 10 to the exhaust gas stream 5. The adding unit 4 includes a nozzle 6, through which the reactant flow 10 can be emitted into the exhaust gas stream 5 in the form of a flow of droplets. The adding unit is formed in this case in such a way that the reactant flow 10 impinges at least partially on the element 3, and in particular on an end face 12 of the element 3, during operation. At least in this region, the element 3 has a porous coating or has a porous form. This coating is preferably formed at least in the last 10% of the length of the element 3.

The nozzle 6 can be connected to a reservoir 8 for a reactant, by a device 7 for transporting the at least one reactant. The reservoir 8, the transporting device 7 and the nozzle 6 are connected to one another by correspondingly constructed lines 9. Urea in an aqueous solution is added, in particular, as the reactant.

Figure 2:
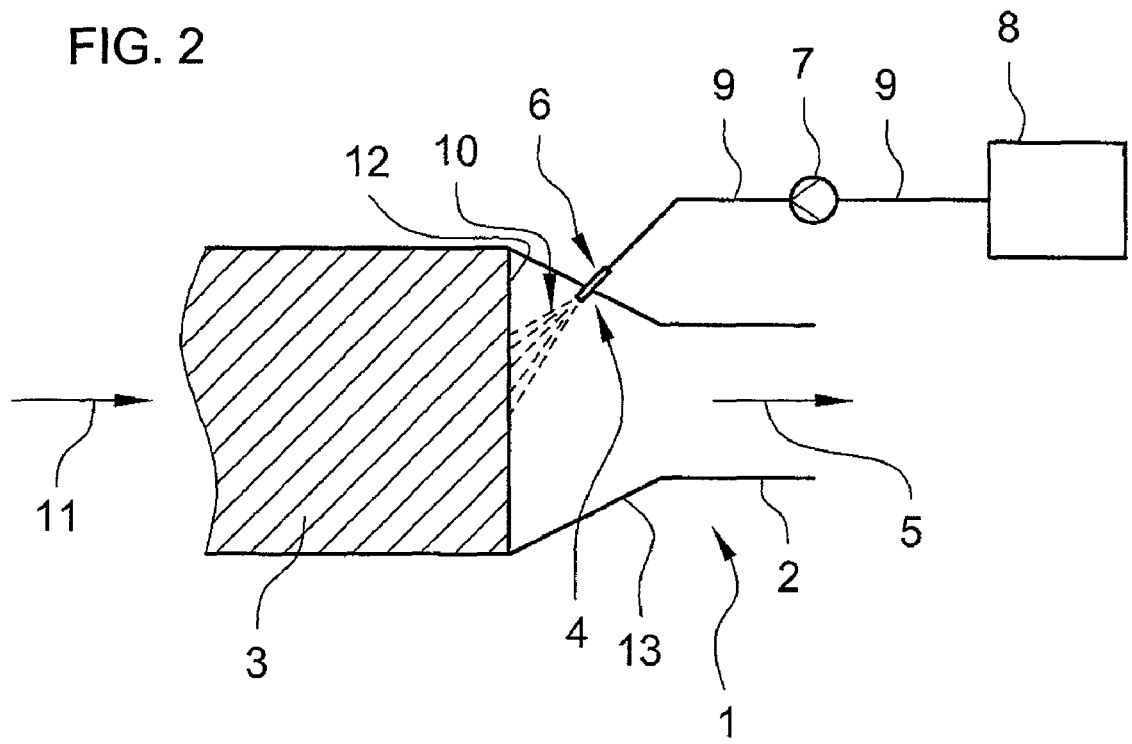
FIG. 2 is a fragmentary, sectional view of a second exemplary embodiment of a device according to the invention.

FIG. 2 diagrammatically shows a second exemplary embodiment of a device 1 according to the invention. The same parts are provided with the same designations in all of the figures. In contrast to the first exemplary embodiment, the exhaust pipe 2 in this case has a conical portion 13, which adjoins the element 3. The adding unit 4 with the nozzle 6 is provided in the conical portion 13 in this case.

Figure 3:
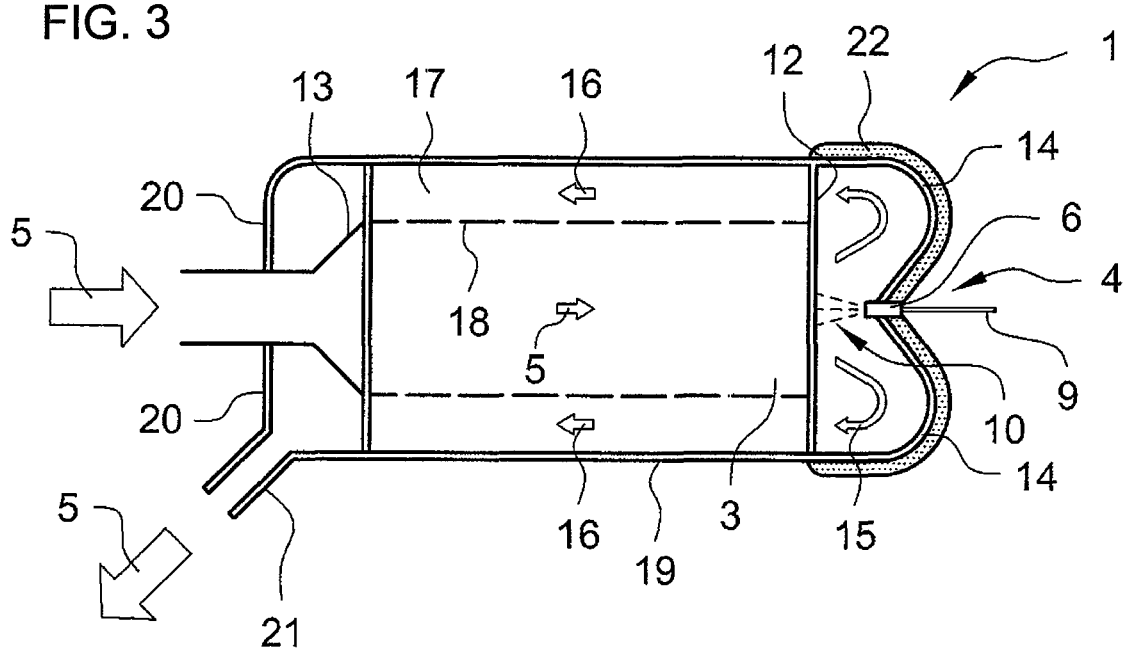
FIG. 3 is a fragmentary, sectional view of a third exemplary embodiment of a device according to the invention.

FIG. 3 diagrammatically shows a third exemplary embodiment of a device 1 according to the invention. In this case, the exhaust gas stream 5 flows into an element 3. After leaving the element 3, the exhaust gas stream 5 flows into a reversal region 14, in which a reversal 15 of the exhaust gas stream 5 takes place. The exhaust gas stream 5 then flows in the form of a return flow 16 through a substantially annular-cylindrical region 17. This annular-cylindrical region 17 may likewise be an element for the conversion and/or elimination of at least one component of the exhaust gas stream, but may in this case too take the form of a region through which a flow can pass substantially freely. The region 17 and the element 3 are separated from each other by a separating wall 18. The separating wall 18 may be formed on one hand as a kind of casing tube, if the region 17 represents a region 17 through which a flow can pass substantially freely, but it may also take the form of a region in the interior of a single honeycomb body that acts on one hand as the element 3 and on the other hand as the region 17. The separating wall 18 may be formed in this case by the formation of a corresponding labyrinth seal where the conical portion 13 is attached to the corresponding honeycomb body. In the case of this exemplary embodiment, the device 1 is delimited by an outer casing tube 19. The return flow 16 of the exhaust gas stream 5 is collected in a discharge region 20 and is discharged through a discharge line 21. In the reversal region 14, the adding unit 4 with the nozzle 6 is formed in such a way that the latter sends the reactant flow 10 at least partially onto the end face 12 of the element 3. In this case, too, the adding unit 4 can be connected through corresponding lines 9 to a non-illustrated transporting device 7 and/or to a reservoir 8. The reversal region 14 is provided with a thermal insulation 22. This advantageously prevents cooling of the exhaust gas stream 5 in the region of the reverse flow 15.

Figure 4:
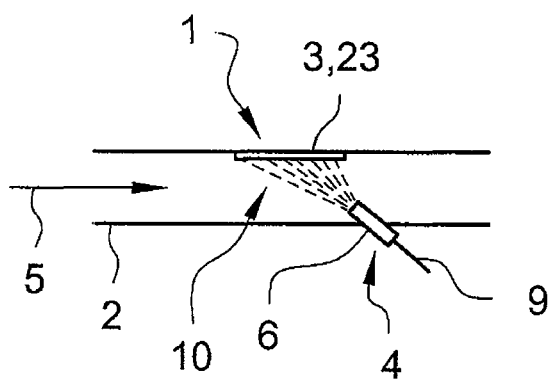
FIG. 4 is a fragmentary, sectional view of a fourth exemplary embodiment of a device according to the invention.

FIG. 4 shows a fourth exemplary embodiment of a device according to the invention. In this case, the element 3 takes the form of a coating 23 on the wall of an exhaust pipe 2. The exhaust gas stream 5 flows through the exhaust pipe 2. A reactant flow can be sprayed at least partially onto the element 3 during operation by an adding unit 4, which is provided downstream of the element 3 and includes a nozzle 6. The adding unit 4 may be connected through lines 9 to corresponding transporting devices and reservoirs 8 for a reactant solution, such as for example a urea-water solution.

Figure 5:
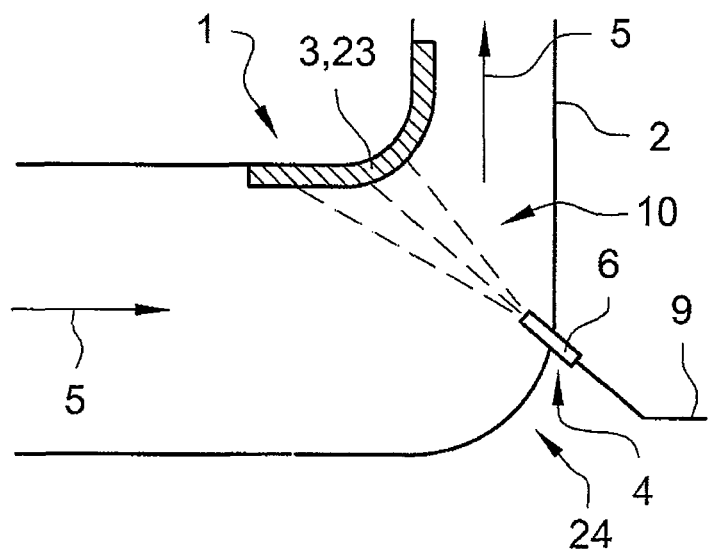
FIG. 5 is a fragmentary, sectional view of a fifth exemplary embodiment of a device according to the invention.

FIG. 5 shows a fifth exemplary embodiment of a device 1 according to the invention. In this case, the exhaust pipe 2 has a deflecting region 24, in which the direction of the exhaust gas stream is changed. At the same time, the exhaust pipe 2 becomes narrower in the deflecting region 24. In this case, too, the element 3 takes the form of a catalytically active coating 23. It is preferably a porous coating which, for example, includes a washcoat. A form of the coating 23 which contains platinum-free catalysts and/or a hydrolysis which, for example, catalytically converts urea into ammonia, is particularly advantageous herein. In this case, too, the adding unit 4 includes a nozzle 6, which can be connected through corresponding lines 9, possibly through a transporting device, to a corresponding reservoir 8 for a reactant solution.

The method according to the invention and the device 1 according to the invention advantageously allow the adding of a reactant, in particular a liquid reactant, in the form of a reactant flow 10, into an exhaust gas stream 5, so that at least part of the reactant flow 10 impinges on an element 3 for the at least partial conversion and/or partial elimination of at least one component of the exhaust gas stream 5. This advantageously achieves rapid evaporation of the reactant flow 10. Impinging on the element 3, which is hot during operation, that is to say is, for example, at temperatures of 400° C. and more, causes rapid evaporation and, because of the porous coating 23 of the element 3 which is preferably provided, take-up of the reactant solution into the element with successive evaporation. This allows urea, in particular, to be evaporated quickly, effectively and virtually completely when it is introduced into an exhaust system of an internal combustion engine and to serve as a reducing agent for the selective catalytic reduction of nitrogen oxides, in particular in an SCR catalytic converter provided downstream.

The invention claimed is:

1. A method for adding at least one reactant to an exhaust gas stream of an internal combustion engine, the method comprising the following steps:
   providing an element for carrying out at least one operation selected from the group consisting of:
   a) an at least partial conversion, and
   b) an at least partial elimination,
      of at least one component of the exhaust gas stream;
      adding a reactant flow, including at least a reducing agent precursor, to the exhaust gas stream downstream of the element to cause at least part of the reactant flow to impinge on the element; and
   providing at least partial regions of the element with a porous coating acting as a catalyst for a hydrolysis of the reducing agent precursor to form a reducing agent for a selective catalytic reduction of nitrogen in an SCR catalytic converter disposed downstream.

2. The method according to claim 1, wherein at least 80% by weight of the reactant flow impinges on the element.

3. The method according to claim 1, wherein the reactant flow includes droplets having a mean diameter of at least 30 micrometers.

4. The method according to claim 1, which further comprises carrying out a decomposition reaction of at least one component of the reactant flow at least in a region in which the reactant flow impinges on the element.

5. The method according to claim 1, which further comprises setting at least one of the following variables:
   a) an average velocity of the reactant flow,
   b) an average mass flow rate of the reactant flow, and
   c) a composition of the reactant flow, in dependence on at least one of the following variables:
   A) a composition of the exhaust gas stream,
   B) an average velocity of the exhaust gas stream, and
   C) characteristic operating variables of the internal combustion engine.

6. The method according to claim 1, which further comprises carrying out the step of adding the reactant flow in a region of an at least partial change in direction of the exhaust gas stream.

7. A device for treating an exhaust gas stream of an internal combustion engine having a direction of flow, the device comprising:
   at least one element for carrying out at least one operation selected from the group consisting of:
   a) an at least partial conversion, and
   b) an at least partial elimination,
      of at least one component of the exhaust gas stream; and
   an adding unit, disposed downstream of said at least one element in the direction of flow, and oriented for adding a reactant flow, including at least a reducing agent precursor, impinging at least partially on said at least one element in an adding region during operation;
   said at least one element having partial regions and a porous coating at least in said partial regions; and
   said coating, at least in said adding region, in which the reactant flow at least partially impinges on said at least one element during operation, acting as a catalyst for a hydrolysis of the reducing agent precursor to form a reducing agent.

8. The device according to claim 7, wherein said adding unit is constructed in such a way that said element is disposed in a direction of average reactant velocity of the reactant leaving said adding unit.

9. The device according to claim 7, wherein said element is porous, at least in partial regions.

10. The device according to claim 9, wherein said coating, at least in a region in which part of the reactant flow impinges on said element during operation, meets at least one of the following conditions:
    a) said coating is platinum-free;
    b) said coating is resistant to water impact;
    c) said coating can take up a liquid; and
    d) said coating has a porosity of 50% or more.

11. The device according to claim 7, wherein said coating, at least in a region in which part of the reactant flow impinges on said element during operation, meets at least one of the following conditions:
    a) said coating is platinum-free;
    b) said coating is resistant to water impact;
    c) said coating can take up a liquid; and
    d) said coating has a porosity of 50% or more.

12. The device according to claim 7, which further comprises a deflecting device for at least partially deflecting the exhaust gas stream, at least in said adding region.

13. The device according to claim 7, wherein said adding unit includes a nozzle.

* * * * *